United States Patent [19]

Mörz

[11] Patent Number: 5,394,618
[45] Date of Patent: Mar. 7, 1995

[54] MULTIPLE COORDINATE FEELER APPARATUS

[75] Inventor: Fridolin Mörz, Wolfertschwenden, Germany

[73] Assignee: Haff & Schneider Werkzeug- und Geratebau GmbH & Co. KG, Pfronten, Germany

[21] Appl. No.: 111,124

[22] Filed: Aug. 24, 1993

[30] Foreign Application Priority Data

Aug. 24, 1992 [DE] Germany ............... 42 28 018.4

[51] Int. Cl.⁶ ........................................... G01B 5/00
[52] U.S. Cl. .......................................... 33/559; 33/556
[58] Field of Search .................. 33/556, 558, 559, 561

[56] References Cited

U.S. PATENT DOCUMENTS

| | | |
|---|---|---|
| 3,250,012 | 5/1966 | Hilton et al. . |
| 3,660,906 | 5/1972 | Zimmerman ............... 33/559 |
| 4,815,214 | 3/1989 | Enderle et al. ............ 33/558 X |
| 4,941,266 | 7/1990 | Bissegger et al. ........... 33/559 X |

FOREIGN PATENT DOCUMENTS

| | | |
|---|---|---|
| 0332575 | 9/1989 | European Pat. Off. . |
| 0346562 | 12/1989 | European Pat. Off. . |
| 2375580 | 12/1977 | France . |
| WO91/10887 | 7/1991 | WIPO . |
| 9114149 | 9/1991 | WIPO . |
| 9301466 | 1/1993 | WIPO .................. 33/561 |

Primary Examiner—Alvin Wirthlin
Attorney, Agent, or Firm—Lyon & Lyon

[57] ABSTRACT

A multiple coordinate feeler apparatus, comprising a housing, a feeler arm axially projecting beyond the housing, the feeler arm having a feeler ball formed at the free end thereof and being axially displaceably supported in the housing and being supported at the housing universally rotatable up to a predetermined maximum angle by a spherical joint of a ring seat formed in a housing plate and of a spherical joint head formed at the feeler arm and rotatably supported on the ring seat, a slide being supported by the spherical joint head and being slidable in the housing against the force of a return spring, the slide being coupled with an indicating means indicating the sliding quantity of the slide, the joint head being liftable out of the ring seat by the axial displacement of the feeler arm. For stabilizing the joint head in its ring seat the joint head is formed as a spherical segment, on which a tilting disk is formed which is tiltably axially supported by its circular peripheral edge at the slide, the tilting disk projecting radially beyond the joint head.

15 Claims, 2 Drawing Sheets

MULTIPLE COORDINATE FEELER APPARATUS

BACKGROUND OF THE INVENTION

This invention relates to a multiple coordinate feeler apparatus. Such a feeler apparatus can, for example, be used for zero point adjustment of a workpiece being machined by a numerically controlled milling machine. The feeler apparatus is clamped into the machine spindle with its feeler ball in contact with a reference feeler edge of the workpiece. The milling machine is then driven until the feeler apparatus indicates that the feeler ball has reached the zero position indicating that the zero point of the coordinate being measured has been reached. When the zero point has been reached, the operation of the milling machine may be adjusted as desired.

In known feeler apparatuses, such as that disclosed in DE-OS 41 00 323, three spherical joints and a tilting joint are required to operate the feeler mechanism. However, the use of multiple joints can affect the accuracy of the apparatus, and can also be expensive. Attempts to adjust the joint clearances in these known mechanisms by the use of tension springs have not solved the problems, since the tension springs cause the apparatus to move too heavily or with too much force. Further, the force exerted by the feeler arm on the joint head in the rotating positions can cause the center of the joint head to shift out of the nominal position, causing measuring errors.

The present invention overcomes these and other problems, by providing a multiple coordinate feeler measuring apparatus of simple construction which can achieve high accuracy and functionality, even when adapted or used for long axial and radial measuring strokes by the feeler ball and feeler arm.

SUMMARY OF THE INVENTION

These and other advantages that will be apparent to those skilled in the art are accomplished by the present invention in which a feeler apparatus comprises a housing; a feeler arm axially projecting beyond the housing, the feeler arm having a feeler ball formed at its free end and being axially displaceably supported in the housing and being universally rotatable up to a predetermined maximum angle by a spherical joint and ring seat formed in a housing plate which rotatably supports the feeler arm, the joint head being liftable out of the ring seat by axial displacement of the feeler arm; a slide supported by the spherical joint head and being slidably guided in the housing against the force of a return spring and coupled with an indicating means which measures and indicates the length of the sliding motion of the slide. In a preferred embodiment of the present invention, the joint head is formed as a spherical segment on which a tilting disk is formed which is tiltably axially supported by its circular peripheral edge at a slide, such that the tilting disk projects radially beyond the joint head, and the plane of the tilting disk extends in the region of the center of curvature of the joint head.

BRIEF DESCRIPTION OF THE DRAWING FIGURES

The features and advantages of the feeler apparatus according to the present invention may be better understood by those skilled in the art by reference to the following drawing figures and the discussion below, in which numerical references in the text correspond to like numbers in the drawing figures, and in which:

FIG. 1 is a longitudinal sectional view of a multiple coordinate feeler apparatus according to the present invention; and FIG. 2 is a partial longitudinal sectional view of an alternative embodiment of a feeler apparatus according to the present invention, depicting the portion of the embodiment in the area of the support of the joint head.

DETAILED DESCRIPTION OF THE PREFERRED EMBODIMENT

Figure 1:
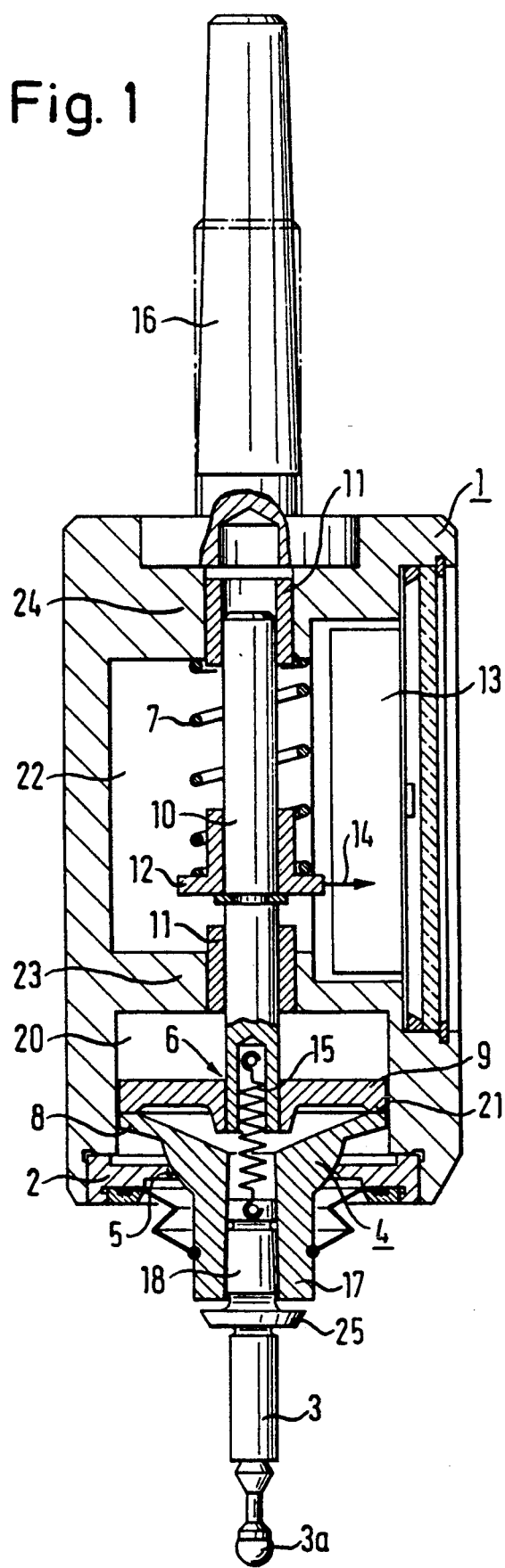

An embodiment of a multiple coordinate feeler apparatus according to the present invention is illustrated in FIG. 1. The apparatus comprises a feeler arm 3 having a feeler ball 3a at its free end, the feeler arm being supported in the housing 1 at a slide 6. A coupling element 14 transfers displacement of the feeler arm 3 to a dial gauge 13, which indicates the magnitude of the displacement.

On top of the housing 1 is a cylindrical or, preferably, conical clamping shaft 16 for clamping the feeler apparatus into the chuck of the milling spindle. In the lower portion of the housing 1, a cylindrical housing chamber 20 is formed, in which is formed a joint head 4, formed as a spherical segment, in a ring seat 5 which is formed in the facing housing plate 2. The joint head 4 supports the feeler arm 3. The joint head carries a tilting disk 8 on its side opposite to the ring seat 5, the tilting disk abutting with its axially projecting circumferential edge 21 axially against a supporting disk 9 of the slide 6. The ball center of the joint head 4 lies in the plane containing the axial circumferential edge 21 of the tilting disk at half the height of edge 21. The cup-shaped tilting head 8 radially projects at all sides beyond the joint head 4, the diameter of its circumferential edge 21 being substantially the same as the diameter of the housing chamber 20 with only a small clearance therebetween. This arrangement permits tilting movements of the tilting disk 8 in the cylindrical housing chamber 20. The tilting disk can also be rounded at its circumferential edge 21, so that the clearance between the circumferential edge 21 and the wall of housing chamber 20 can further be made smaller and the tilting disk is better axially guided in the housing for axial displacements. The radially projecting portion of the tilting disk 8 is conically shaped at its lower side facing the ring seat 5. The ratio between the outer diameter of the tilting disk 8 and the ball diameter of the joint head 4 is approximately 1.4 in this preferred embodiment, and the ratio between the diameter of the ring seat 5 and the ball diameter of the joint head 4 is approximately 0.85.

The supporting disk 9 of the slide 6 is fitted to the lower end of a slide shaft 10 which extends throughout the upper bordering wall 23 of the lower housing chamber 20 and the overlying upper housing chamber 22 up to its upper bordering wall 24. The supporting disk 9 is guided in the bordering walls 23, 24 in slidings 11. A return spring 7 is stretched between the upper bordering wall 24 and a spring disk 12 fitted to the slide shaft 10. A tension spring 15 is also tensioned between the slide 6 and the joint head. By the spring disk 12, the coupling element 14 with the dial gauge 13 is formed.

In the home position of the feeler apparatus as shown in FIG. 1, the feeler arm 3 is in the apparatus axis and the axial peripheral edge of the tilting disk 8 abuts round about against the lower peripheral edge of the supporting disk 9. If, for example, an axial reference plane of the workpiece is to be measured, an axial displacement of the feeler arm 3 together with the joint head 4, the tilting disk 8 and the slide 6 against the force of the return spring 7 is established. However, when measuring lateral reference edges of the workpiece, the feeler arm is rotated about the ball center of the joint head 4, so that the tilting disk 8 tilts relative to the supporting disk 9 of the slide 6 and displaces the slide 6 by a respective amount against the force of the return spring 7 and of the tension spring 15. Thereby, under the force acting on the feeler ball 3a, a moment of rotation about the point of the ring seat 5 lying in the plane of action of this force results. However, due to the fact that the tilting disk 8 radially projects beyond the ring seat and that the actual tilting axis of the tilting disk 8 (at which the force of the return spring 7 and the tension spring 15 acts on the tilting disk and on the joint head 4) is lying radially outside in a distance from the next adjacent point of the ring seat 5, a moment of rotation acting against the moment of rotation mentioned above is created. Accordingly, the joint head 4 remains in its seat with the position of its ball center unchanged, so that axial shifts of the joint head do not result, thereby preventing measuring faults from occurring.

A cone chuck 17 is formed at the lower side of the joint head 4, in which cone chuck the feeler arm is interchangeably fixed by means of a cone shaft 18. Below the cone shaft 18, an ejection flange 25 is formed at the feeler arm 3 so that the feeler arm 3 can be replaced by being levered out by means of a slot screw driver which is inserted into the gap between the ejection flange 25 and the cone chuck 17.

Figure 2:
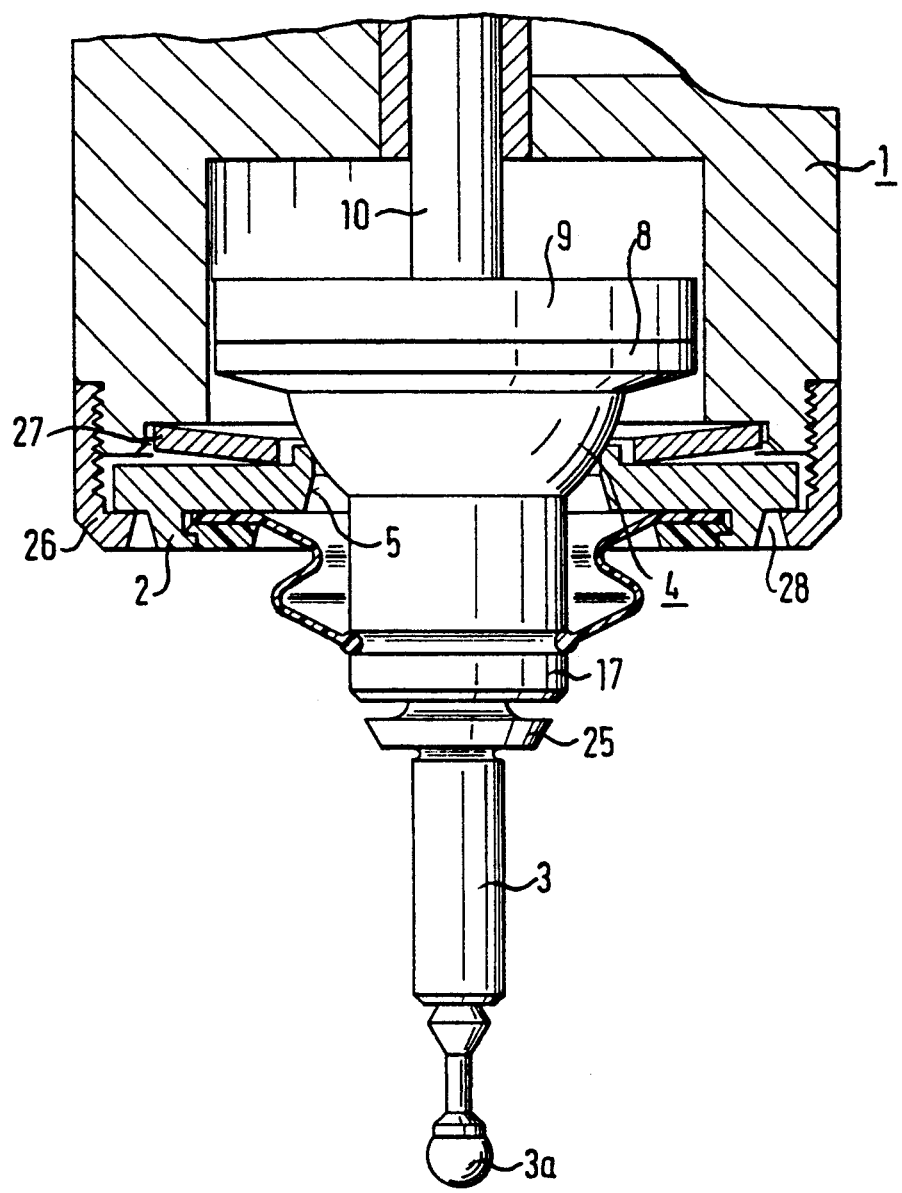

Referring now to FIG. 2, which depicts an alternative embodiment of the present invention, which is similar to the embodiment of FIG. 1, except as discussed below, the housing plate 2, in which the ring seat 5 for the joint head 4 is formed, is held with radial clearances in a threaded pressure ring 26 bolted with the housing 1. A cup spring 27 is clamped between the housing plate 2 and the housing 1. Further, an outer axial annular gap 28 is present between the pressure ring 26 and the housing plate 2. Therefore, the housing plate 2, and the ring seat 5 can be radially displaced by means of a tool like a slot screw driver inserted into the annular gap 28, in order to compensate for any deviation or eccentricity from the axis of the feeler apparatus observed by means of a dial gauge at the feeler ball 3a. For normal use of the feeler apparatus, the spring force of the cup spring 27 and, therefore, the friction connection between the housing plate 2 and the pressure ring 26 can be adjusted by means of the pressure ring 26.

In the two embodiments described above, the feeler arm 3 is immediately supported at the slide by the tilting disk 8, which allows direct motion transmission from the feeler ball 3a to the slide 6, thereby eliminating the need for intermediate joints in the supporting train. Further, since the tilting disk 8 radially projects beyond the joint head 4 and the ring seat 5 for the joint head, a counter moment against the moment of rotation of the feeler pressure and the lever arm of the feeler arm 3 acting on the joint head 4 exists in the rotational positions of the tilting disk 8 due to the eccentric force of the return spring 7 of the measuring slide 6 on the joint head 4. As a result, the ball center of the joint head 4 and the actual rotating axis of the feeler arm 3 do not shift, thereby stabilizing the joint head 4 in its position in the ring seat 5. The novel arrangement of the present invention also permits the use of a relatively weak or low-tension slide return spring 7, thereby achieving free and easy motion of the feeler apparatus without adversely affecting the accuracy of the apparatus.

Further, since the plane of the tilting disk 8 extends into the region of the center of curvature of the joint head 4, the present invention only requires a small clearance between the tilting disk 8 and the housing wall surrounding it, and a small radial displacement of the point of contact between the slide 6 and the tilting disk 8 during the tilting motion of the disk, even at relatively large tilting angles.

In another aspect of the present invention, the portion of the tilting disk 8 radially projecting beyond the joint head 4 is conically shaped on the side facing the ring seat 5, with the fictitious apex of the cone located on the side of the disk opposite the slide. By shaping the tilting disk 8 in this way, the free tilting angle of the feeler arm 3 is prevented from becoming too small, even when the projecting length of the tilting disk 8 beyond the joint head 4 is relatively great, and even when a housing of small dimensions is used.

As described, the slide 6 preferably comprises a supporting disk 9 coinciding in its diameter with that of the tilting disk 8, with the supporting disk 9 resting against the tilting disk 8. The supporting disk 9 can be fitted on a slide shaft to slidably support the slide 6 in the housing engaged with the return spring 7. A coupling element 14 can be provided at the slide shaft for transmitting the magnitude of the displacement of the slide 6 to the indicating means 13.

The indicating means 13 of the present invention may be a pointer dial gauge which is coupled to the slide 6 either mechanically, optoelectronically, inductively, or by any other method known in the art.

In yet another aspect of the present invention, in addition to the return spring 7 engaging the measuring slide, a tension spring 15 may also be provided tensioned between the slide 6 and the joint head 4 in order to further assist the return movement of the tilting arm from its rotating position into the axial position.

In prior art feeler apparatuses, exact alignment of the center of the feeler ball with the spindle axis of the milling machine was achieved by radially adjusting the axis of the measuring slide by manipulating four adjusting screws. The present invention eliminates the need for these four adjusting screws by axially bracing the housing plate carrying the ring seat 5 with the housing by means of a pressure ring 26 and cup spring 27 and holding the housing plate in the pressure ring 26 with a circumferential clearance. This arrangement forms an outer axial ring groove which can be engaged by a lever tool, such as a slot screw driver or other suitable tool, to lever the joint head 4 in a desired radial direction with respect to the housing plate and ring seat 5, to eliminate any eccentricity of the feeler ball from the spindle axis. To determine whether any such eccentricity exists, and how much, a dial gauge may be applied to the feeler ball while the feeler apparatus is clamped to the milling machine and the spindle of the milling machine is rotated. To correct for any detected eccentricity, the housing plate may be levered in the appropriate radial direction relative to the pressure ring 26 and the housing until the feeler ball has been properly aligned. It is not necessary to loosen the pressure ring 26 during such an adjustment, since the friction created by the force of the cup spring 27 ensures that the housing plate remains in a stable position during normal use of the feeler apparatus. Although the arrangement and method of adjustment described hereinabove is particularly suited for the feeler apparatus of the present invention, it may, however, also be used in other types of multiple coordinate feeler apparatuses.

Though in the present invention the feeler arm 3 and joint head 4 may be integrally formed, it may be preferable in certain applications to design the feeler apparatus so that it can adjustably accommodate interchangeable feeler arms of differing lengths. In an alternative embodiment of the present invention in which different feeler arms may be interchangeably attached, a chuck 17, preferably a cone chuck, is formed in the joint head 4 at the side opposite the housing, into which a feeler arm may be fixed by means of a shaft 18, preferably as cone shaft. A cone attachment is especially desirable, since it enables feeler arms to be interchanged without adversely affecting accuracy and without creating deviations in the alignment of the feeler arm, thereby eliminating the need to test for eccentricities every time a new feeler arm is attached. Additionally, the use of cone attachments insures that the feeler arm is attached with sufficient tightness. The feeler apparatus of the present invention is particularly well-suited for interchangeable feeler arms generally, and for cone attachments specifically, since the counter moment acting on the joint head 4 via the tilting disk 8, described above, favors such attachments by increasing the compensation of the moment of rotation with increasing feeler arm lengths.

Although this particular invention has been described in detail with particular reference to the exemplary embodiments, various modifications may be made to it by one skilled in the art without affecting the scope or spirit of the present invention as set forth in the appended claims.

I claim:

1. A multiple coordinate feeler apparatus, comprising:
   a housing;
   a housing plate disposed on said housing;
   a ring seat disposed in the housing plate;
   a spherical joint head formed of a spherical segment and rotatably supported on the ring seat such that the ring seat and spherical joint head form a spherical joint, the spherical joint head being liftable out of the ring seat;
   a tilting disk formed on said spherical segment and projecting radially beyond the spherical joint head;
   a feeler arm axially projecting beyond the housing and being supported by said spherical joint and by said spherical joint head such that said feeler arm is axially displaceably supported in the housing and is universally rotatable up to a predetermined maximum angle, said feeler arm being disposed in said spherical joint and spherical joint head such that axial displacement of the feeler arm lifts the spherical joint head out of the ring seat;
   a feeler ball formed at the free end of said feeler arm;
   a slide supported by said tilting disk and disposed to slide axially in the housing against the force of a return spring in response to either axial displacement of the feeler arm or rotation of the spherical joint; and
   indicating means coupled to said slide for indicating the sliding quantity of said slide.

2. The feeler apparatus of claim 1, wherein the portion of the tilting disk that radially projects beyond the joint head is conically shaped at its side facing the ring seat.

3. The feeler apparatus according to claim 1, wherein the slide comprises a supporting disk corresponding in its diameter with the tilting disk, the tilting disk abutting with its axial circumferential edge against the supporting disk.

4. The feeler apparatus according to claim 3, wherein the supporting disk is fitted on a slide shaft, said slide shaft disposed to guide the slide in the housing.

5. The feeler apparatus of claim 3, further comprising a cylindrical housing chamber disposed in the housing and bordered by a radial wall.

6. The feeler apparatus of claim 5, wherein the supporting disk comprises an annular disk disposed in the cylindrical housing chamber.

7. The feeler apparatus of claim 6, wherein the outer diameter of the supporting disk is substantially the same as the diameter of the housing chamber.

8. The feeler apparatus of claim 5, wherein the supporting disk is fitted on a slide shaft slidably guided within the radial wall.

9. The feeler apparatus according to claim 1, further comprising a tension spring tensioned between the slide and the joint head.

10. The feeler apparatus of claim 1, further comprising a cone chuck formed at the joint head at the side opposite the housing, and a cone shaft for interchangeably fixing the feeler arm in the cone chuck.

11. The feeler apparatus of claim 1, wherein the housing plate is substantially circular and includes a central portion and an outer edge, said ring seat being disposed in the central portion of the housing plate.

12. The feeler apparatus of claim 11, further comprising a pressure ring formed on the housing which supports the outer edge of the housing plate such that the housing plate is laterally moveable within the housing.

13. The feeler apparatus of claim 12, further comprising a cup spring which holds the outer edge of housing plate in contact with the pressure ring such that an annular gap exists between the central portion of the housing plate and the pressure ring into which a lever tool may be inserted to induce lateral movement of the housing plate within the housing.

14. A multiple coordinate feeler apparatus, comprising:
   a housing;
   a housing plate disposed on said housing;
   a ring seat disposed in the housing plate;
   a spherical joint head formed of a spherical segment and rotatably supported on the ring seat such that the ring seat and spherical joint head form a spherical joint, the spherical joint head being liftable out of the ring seat;
   a tilting disk formed on said spherical segment having an axial circumferential edge projecting radially beyond the spherical joint head;
   a feeler arm axially projecting beyond the housing and being supported by said spherical joint and by said spherical joint head such that said feeler arm is axially displaceably supported in the housing and is universally rotatable up to a predetermined maximum angle, said feeler arm being disposed in said spherical joint and spherical joint head such that axial displacement of the feeler arm lifts the spherical joint head out of the ring seat;
   a feeler ball formed at the free end of said feeler arm;
   a supporting disk having a diameter corresponding to that of the tilting disk and abutting against the axial circumferential edge of the tilting disk;

a slide supported by the supporting disk and disposed to slide axially in the housing against the force of a return spring; and indicating means coupled to said slide for indicating the sliding quantity of said slide.

15. The feeler apparatus according to claim 14, wherein the supporting disk is fitted on a slide shaft, said slide shaft disposed to guide the slide in the housing.

* * * * *